United States Patent
Heo et al.

(10) Patent No.: US 9,019,414 B2
(45) Date of Patent: Apr. 28, 2015

(54) METHOD, APPARATUS, AND COMPUTER-READABLE STORAGE MEDIUM FOR SELECTING OPERATION MODE BASED ON REFERENCE PHOTOGRAPHING SETTING

(75) Inventors: Jung-ah Heo, Seoul (KR); Se-hyun Park, Seoul (KR); Hye-jin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 74 days.

(21) Appl. No.: 13/555,507

(22) Filed: Jul. 23, 2012

(65) Prior Publication Data

US 2013/0083218 A1    Apr. 4, 2013

(30) Foreign Application Priority Data

Sep. 30, 2011    (KR) ................ 10-2011-0100320

(51) Int. Cl.
*H04N 5/222*    (2006.01)
*H04N 5/232*    (2006.01)

(52) U.S. Cl.
CPC .................... *H04N 5/232* (2013.01)

(58) Field of Classification Search
CPC .............. H04N 5/323; H04N 5/23216; H04N 5/23245; H04N 1/00408–1/00472; G06F 3/005; G06F 3/0416; G06F 3/048–3/04897
USPC ................... 348/207.99, 222.1, 229.1, 230.1, 348/333.01–333.13; 396/137, 147, 396/287–292, 374
See application file for complete search history.

(56) References Cited

U.S. PATENT DOCUMENTS

2006/0072028 A1* 4/2006 Hong ...................... 348/333.01
2011/0164164 A1* 7/2011 Aoki et al. ............... 348/333.01
2012/0127332 A1* 5/2012 Park et al. ................. 348/222.1

OTHER PUBLICATIONS

"Sony A230 Digital Single Lens Reflex Camera Instruction Manual", Sony Corporation, 2009.*

* cited by examiner

*Primary Examiner* — Dennis Hogue
(74) *Attorney, Agent, or Firm* — Drinker Biddle & Reath LLP

(57) ABSTRACT

A digital photographing apparatus controlling method includes: providing menus for respectively adjusting a reference photographing setting value and first group photographing setting values; and setting an operation mode according to which one of the reference photographing setting value and the first group photographing setting values a user has selected.

19 Claims, 10 Drawing Sheets

METHOD, APPARATUS, AND COMPUTER-READABLE STORAGE MEDIUM FOR SELECTING OPERATION MODE BASED ON REFERENCE PHOTOGRAPHING SETTING

CROSS-REFERENCE TO RELATED PATENT APPLICATION

This application claims the benefit of Korean Patent Application No. 10-2011-0100320, filed on Sep. 30, 2011, in the Korean Intellectual Property Office, the disclosure of which is incorporated herein in its entirety by reference.

BACKGROUND

Various embodiments generally relate to a digital photographing apparatus, a method of controlling the same, and a non-transitory computer-readable storage medium that stores computer program codes for executing the method.

Digital photographing apparatuses produce a captured image by receiving an optical signal and converting the optical signal to an electrical signal. A user may change photograph setting values, photographic effects, and the like of a digital photographing apparatus to apply desired setting values and effects to a captured image. Recently, a user interface for adjusting photograph setting values is provided in digital photographing apparatuses.

SUMMARY

According to various embodiments, a user may set an operation mode easily and intuitively.

According to other embodiments, a user may also easily set photographing setting values.

According to an embodiment, there is provided a digital photographing apparatus controlling method including: providing menus for respectively adjusting a reference photographing setting value and first group photographing setting values; and setting an operation mode according to which one of the reference photographing setting value and the first group photographing setting values a user has selected.

The setting of the operation mode may include determining whether the reference photographing setting value has been switched on; adjusting the first group photographing setting values correspondingly with one another when the reference photographing setting value has been switched on; and adjusting the first group photographing setting values independently from one another when the reference photographing setting value has been switched off.

In the adjusting of the first group photographing setting values correspondingly with one another, when a user input of adjusting one of the first group photographing setting values is made, the other first group photographing setting values may be adjusted.

When the reference photographing setting value has been switched on and at least two of the first group photographing setting values are selected, the digital photographing apparatus controlling method may further include providing a menu through which a combination of the at least two first group photographing setting values is selected.

The digital photographing apparatus controlling method may further include providing a mark representing a current mode according to at least one of whether the reference photographing setting value has been switched on and which one of the first group photographing setting values the user has selected.

The reference photographing setting value may be a brightness correction value, and the first group photographing setting values may be at least one of a value selected from the group consisting of a shutter speed, an aperture value, and an image pickup device's sensitivity.

Menus for the reference photographing setting value and the first group photographing setting values may be provided to display a plurality of selectable numerically-represented candidate setting values.

According to another embodiment, there is provided a digital photographing apparatus including: a user interface (UI) provider which provides menus for respectively adjusting a reference photographing setting value and first group photographing setting values; and a mode setting unit which sets an operation mode according to which one of the reference photographing setting value and the first group photographing setting values a user has selected.

According to another embodiment, there is provided a non-transitory computer-readable storage medium for storing computer program codes for executing a digital photographing apparatus controlling method, the digital photographing apparatus controlling method including: providing menus for respectively adjusting a reference photographing setting value and first group photographing setting values; and setting an operation mode according to which one of the reference photographing setting value and the first group photographing setting values a user has selected.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The following description and drawings are referred to in order to gain a sufficient understanding of the embodiments, and matters that can be easily implemented by one of ordinary skill in the art to which this invention belongs are not described.

Also, the following description and drawings are not to be construed as limiting the invention, and the scope of the invention should be defined by the claims. Terms used herein should be interpreted as having a meaning that is consistent with the technical spirit of the invention, in order to most appropriately express the invention.

The embodiments will now be described more fully with reference to the accompanying drawings. Expressions such as "at least one of," when preceding a list of elements, modify the entire list of elements and do not modify the individual elements of the list.

Figure 1:
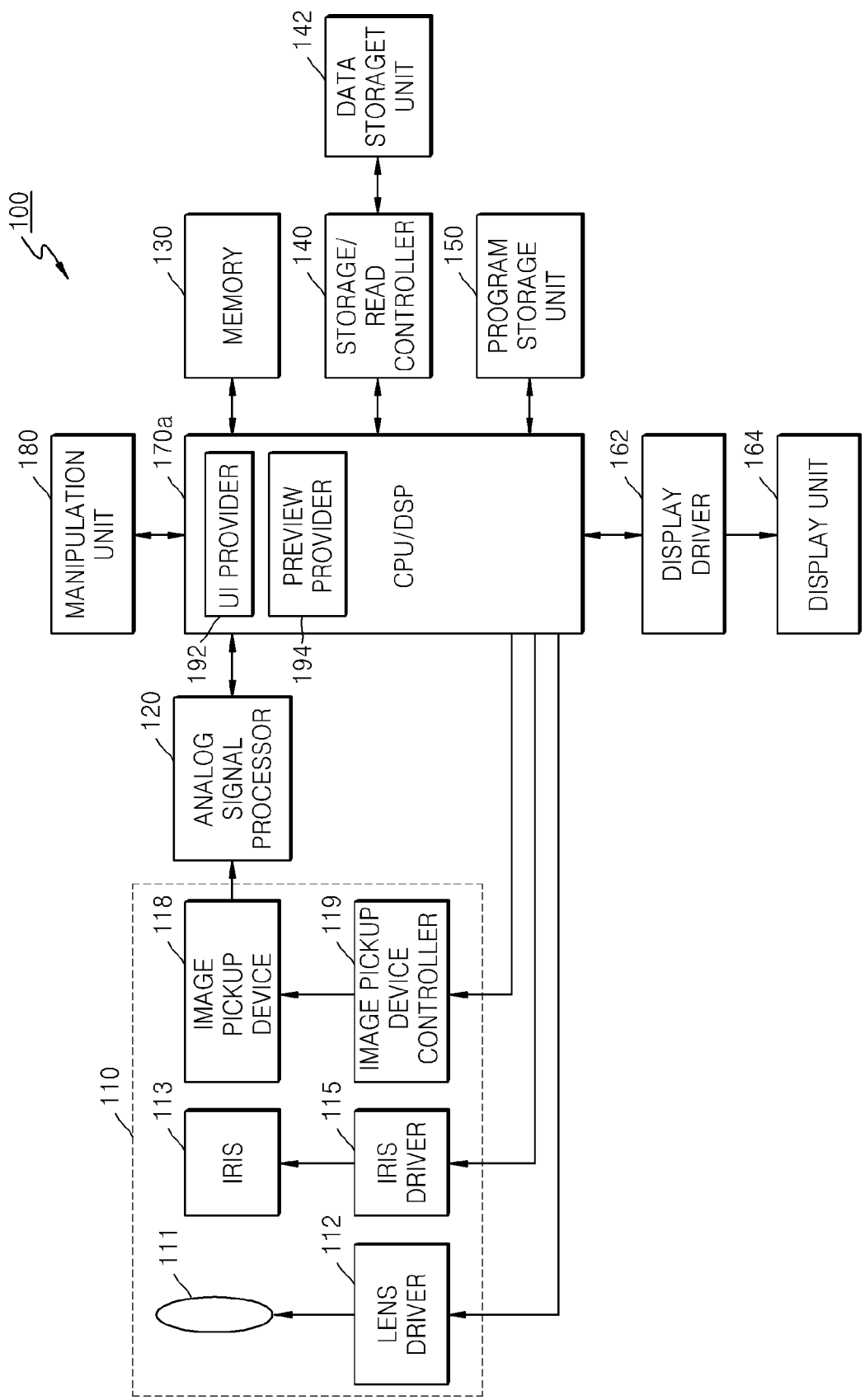
FIG. 1 is a block diagram of a digital photographing apparatus, according to an embodiment.

FIG. 1 is a block diagram of a digital photographing apparatus 100, according to an embodiment.

Referring to FIG. 1, the digital photographing apparatus 100 may include a photographing unit 110, an analog signal processor 120, a memory 130, a storage/read controller 140, a data storage unit 142, a program storage unit 150, a display driver 162, a display unit 164, a central processing unit (CPU)/digital signal processor (DSP) 170a, and a manipulation unit 180.

The CPU/DSP 170a controls overall operation of the digital photographing apparatus 100. The CPU/DSP 170a provides a lens driver 112, an iris driver 115, and an image pickup device controller 119 with control signals for the operations of the lens driver 112, the iris driver 115, and the image pickup device controller 119.

The photographing unit 110 is a component that generates an electrical signal representative of incident light and includes a lens 111, the lens driver 112, an iris 113, the iris driver 115, an image pickup device 118, and the image pickup device controller 119.

The lens 111 may include groups of lenses. A position of the lens 111 is controlled by the lens driver 112. The lens driver 112 controls a position of the lens 111 according to a control signal provided from the CPU/DSP 170a.

A degree of openness/closeness of the iris 113 is controlled by the iris driver 115, thereby controlling the amount of light incident on the image pickup device 118.

An optical signal transmitted through the lens 111 and the iris 113 forms an image of an object on a light-receiving side of the image pickup device 118. The image pickup device 118 may be a Charge-Coupled Device (CCD) image sensor or a Complementary Metal-Oxide Semiconductor Image Sensor (CIS) that converts an optical signal to an electrical signal. The sensitivity or the like of the image pickup device 118 can be controlled by the image pickup device controller 119. The image pickup device controller 119 controls the image pickup device 118 according to a control signal automatically generated by a real-time input image signal or a control signal manually input by a user via the manipulation unit 180.

A shutter (not shown) controls a light-exposure time of the image pickup device 118.

Examples of the shutter include a mechanical shutter that adjusts the incidence of light by moving a screen and an electronic shutter that controls light-exposure by providing an electrical signal to the image pickup device 118.

The analog signal processor 120 performs noise reduction, gain adjustment, waveform shaping, analog-to-digital conversion (ADC), etc. on an analog signal generated and provided from the image pickup device 118.

A signal output from the analog signal processor 120 may be input to the CPU/DSP 170a directly or via the memory 130. Herein, the memory 130 operates as a main memory of the digital photographing apparatus 100 and temporarily stores information necessary for an operation of the CPU/DSP 170a. The program storage unit 150 stores programs, such as an operating system for driving the digital photographing apparatus 100 and an application system.

The digital photographing apparatus 100 includes the display unit 164 for displaying an operation state of the digital photographing apparatus 100 or information regarding an image captured by the digital photographing apparatus 100. The display unit 164 may provide visual information and/or auditory information to the user. To provide the visual information, the display unit 164 may include, for example, a Liquid Crystal Display (LCD), or an Organic Light Emitting Display (OLED). The display unit 164 may be a touch screen for recognizing a touch input.

The display driver 162 generates and provides a driving signal to the display unit 164.

The CPU/DSP 170a processes an input image signal and controls corresponding components of the digital photographing apparatus 100 according to the processed image signal or an input signal from the outside. The CPU/DSP 170a may reduce noise of input image data and perform image signal processing for image quality improvement, for example, gamma correction, color filter array interpolation, color transforms using a matrix, color correction, and color enhancement. In addition, the CPU/DSP 170a may generate an image file by compressing image data obtained by the image signal processing for image quality improvement or restore the image data from the image file. A compression format of an image may be a reversible format or an irreversible format. Examples of a proper format for a still image may include a Joint Photographic Experts Group (JPEG) format and a JPEG 2000 format. In addition, when a moving picture is recorded, a video file may be generated by compressing a plurality of frames according to the Moving Picture Experts Group (MPEG) standard. An image file may be generated, for example, in accordance with the Exchangeable image file format (Exif) standard.

The image data output from the CPU/DSP 170a is input to the storage/read controller 140 directly or via the memory 130, wherein the storage/read controller 140 stores the image data in the data storage unit 142 automatically or according to (e.g., in response to) a signal from the user. The storage/read controller 140 may read data regarding an image from an image file stored in the data storage unit 142 and provide the read data to the display driver 162 via the memory 130 or another path to display an image on the display unit 164. The data storage unit 142 may be detachably installed on the digital photographing apparatus 100.

The CPU/DSP 170a may also perform obscurity processing, color processing, blur processing, edge emphasis processing, image analysis processing, image recognition processing, image effect processing, etc. Face recognition, scene recognition, or the like may be performed as the image recognition processing. The CPU/DSP 170a may also perform display image signal processing to display an image on the display unit 164. For example, brightness level adjustment, color correction, contrast adjustment, contour emphasis adjustment, screen division, creation of a character image and the like, and image synthesis may be performed. The CPU/DSP 170a may be connected to an external monitor, perform predetermined image signal processing so that an image is displayed on the external monitor, and transmit processed image data to the external monitor so that a corresponding image is displayed on the external monitor.

In addition, the CPU/DSP 170a may generate control signals for controlling, for example, auto focusing (AF), a zoom change, a focus change, and auto exposure (AE) correction, by executing programs stored in the program storage unit 150 or using a separate module, provide the control signals to the iris driver 115, the lens driver 112, and the image pickup device controller 119, and generally control operations of components of the digital photographing apparatus 100, such as a shutter and a strobe.

Through the manipulation unit 180, a user can input a control signal. The manipulation unit 180 may include various functional buttons, such as a shutter-release button that inputs a shutter-release signal to take a picture by exposing the image pickup device 118 to light for a predetermined period of time, a power button that inputs a control signal to control power ON/OFF, a zoom button that widens or narrows a viewing angle, a mode selection button, and other photograph setting value adjustment buttons. The manipulation unit 180 may be implemented by any element enabling a user to input a control signal, for example, by a button, a keyboard, a touch pad, a touch screen, and a remote controller.

The CPU/DSP 170a, according to an embodiment, may include a user interface (UI) provider 192 and a preview provider 194.

The UI provider 192 provides UIs, according to various embodiments. The UI provider 192 may provide a UI as a UI screen on the display unit 164. UIs may be controlled by a user input to the manipulation unit 180.

The preview provider 194 generates a preview from an image pickup signal received from the photographing unit 110 and the analog signal processor 120, and provides the preview on the display unit 164. The operations of the UI provider 192 and the preview provider 194 will be described in more detail later.

Figure 2:
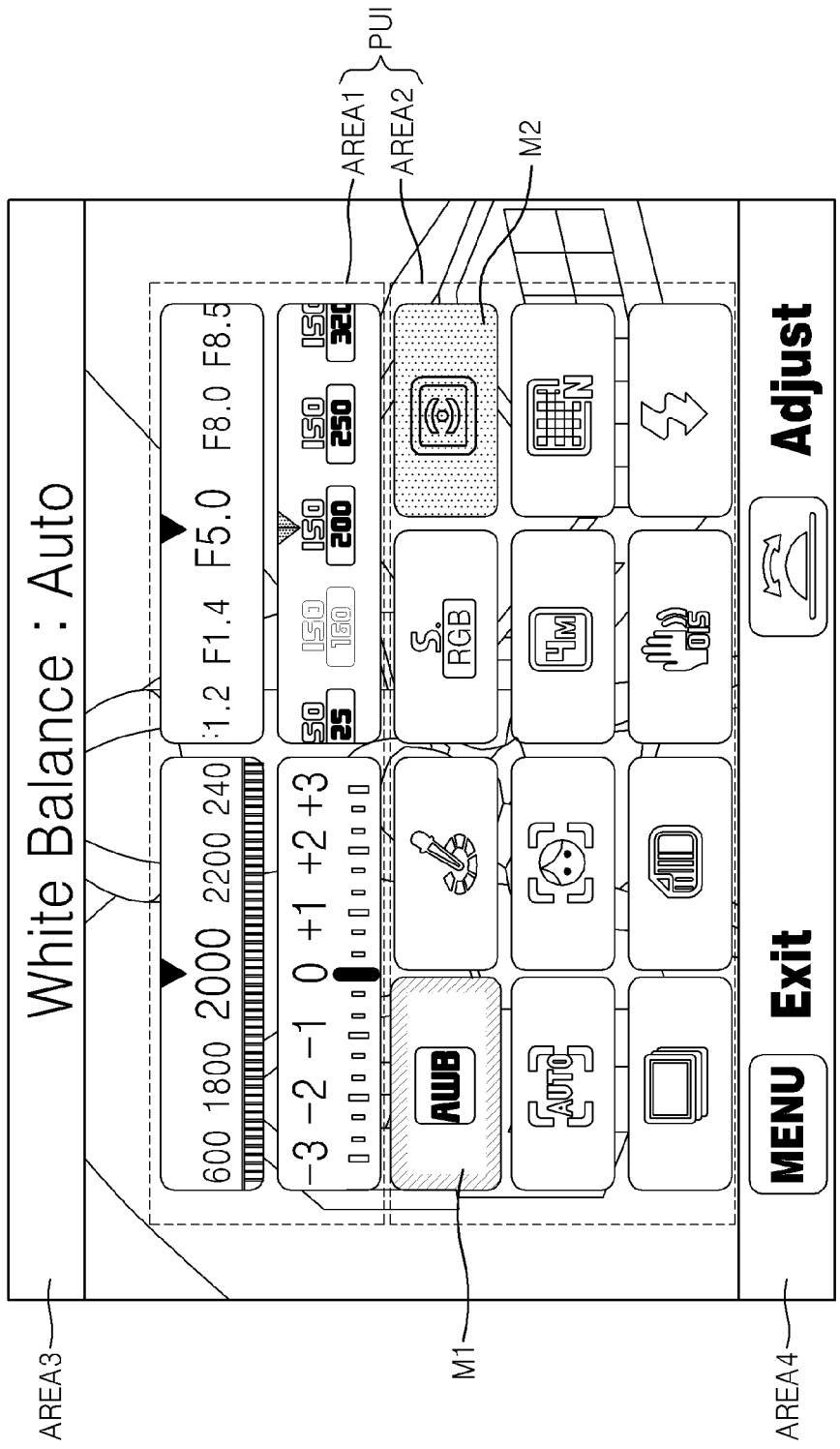
FIG. 2 illustrates a user interface (UI) screen, according to an embodiment.

FIG. 2 illustrates a UI screen, according to an embodiment.

Referring to FIG. 2, a UI includes a first area AREA1, a second area AREA2, a third area AREA3, and a fourth area AREA4. Menus arranged in a lattice arrangement in each of the first area AREA1 and the second area AREA2 constitute a user interface PUI.

According to the embodiment, as illustrated in FIG. 2, the menus are displayed in a semi-transparent state and thus a preview image and the menus may be viewed simultaneously.

According to the embodiment, first menus may be arranged in the first area AREA1 and second menus may be arranged in the second area AREA2.

The first menus are menus for changing first group photographing setting values. For example, the first group photographing setting values may be selected from the group consisting of a shutter speed, an aperture value, a brightness correction value, and an image pickup device's sensitivity. The first menus may sequentially list and show in an analog manner candidate setting values of the first group photographing setting values that are represented numerically. For example, as illustrated in FIG. 2, a shutter speed, an aperture value (for example, an F number), a brightness correction value (for example, an EV value), and an image pickup device's sensitivity (for example, an ISO value) on the first menus may be displayed as a list of a plurality of candidate setting values.

According to an embodiment, the first menus may sequentially list and show in an analog manner the numerical candidate setting values of the first group photographing setting values, and may display a change of the first group photographing setting values so that a user can easily verify the changes of the first group photographing setting values that are made correspondingly.

According to an embodiment, a user may easily recognize what photographing setting values have been changed due to his or her own manipulation and what current photographing setting values change correspondingly, so that the user may easily verify a manipulated state of the digital photographing apparatus 100 and take a picture according to his or her intention. In addition, according to the embodiment, the user can dynamically recognize operations automatically performed by the digital photographing apparatus 100, and thus, may get the impression that the digital photographing apparatus 100 is smart.

Moreover, according to an embodiment, when a photographing setting value of each first menu changes, an effect of showing a process in which the photographing setting value changes may be maximized. The effect may be maximized by displaying a process in which candidate setting values ranging between an initial value and a final value are sequentially displayed, and the photographing setting value is changed to the final value. When a photographing setting value is changed, if the photographing setting value is only changed from an initial value to a final value, a user has difficulty in recognizing whether photographing setting values other than the photographing setting value changed by a user have been changed. However, according to an embodiment, the effect of showing a user a process in which a photographing setting value is changing may be maximized as described above, so that the user may easily recognize that photographing setting values are changed correspondingly.

According to an embodiment, the first menus may list and show some of the candidate setting values of the first group photographing setting values. In this case, a user is able to adjust a first group photographing setting value while concretely recognizing its candidate setting values.

According to another embodiment, the first menus may provide a list of all of the candidate setting values of the first group photographing setting values. In this case, a user may recognize the range of candidate setting values that can be currently set.

According to the embodiment, the range of candidate setting values may vary according to the kind of hardware which is combined with the digital photographing apparatus 100. For example, when the digital photographing apparatus 100 is constructed with interchangeable lenses, the range of the candidate setting values of an aperture value and the range of the candidate setting values of a shutter speed may vary according to the type of lens which is coupled to the digital photographing apparatus 100, and thus, the ranges of candidate setting values to be provided to the first menus may vary. According to the embodiment, a user easily recognizes how candidate setting values change according to the replacement of hardware, so as to increase user convenience.

The second menus are menus for changing second group photographing setting values having selectable candidate setting values. The second menus show currently set candidate setting values and do not show other candidate setting values. Photographing setting values set in the second menus may be, for example, a white balance, a storage file format, a light measurement mode, auto-focusing, face recognition, burst shooting, handshaking correction, a strobo, and the like.

According to an embodiment, a menu deactivated in a current mode shows this deactivation by using a method, for example, by being displayed more blurredly than activated menus or displayed in a different color from the activated menus. In the embodiment as illustrated in FIG. 2, a light measurement mode setting menu M2 is deactivated.

The photographing setting values respectively corresponding to the menus are adjusted according to a user's input. According to an embodiment, current states of a plurality of photographing setting values are displayed on one screen so that a user can change several photographing setting values on one screen, whereby the user may conveniently adjust the photographing setting values.

In addition, referring to FIG. 2, when a user selects a specific menu by moving a cursor on the UI, a description about the specific menu is displayed on the third area AREA3. For example, as illustrated in FIG. 2, when a user selects an auto white balance setting menu M1, a description about the auto white balance setting menu M1, for example, White Balance, and a current setting value Auto are displayed on the third area AREA3. The user may directly change a selected photographing setting value on a current screen by referring to the description displayed on the third area AREA3.

When a user changes a photographing setting value, the photographing setting value changed by the user may be reflected on a preview image displayed together with the UI. To this end, the preview provider 194 performs image processing for reflecting the photographing setting value to the preview image, and provides a preview image as a result of the reflection to the display unit 164.

Moreover, according to an embodiment, a menu button MENU for moving to another menu, an exit button Exit for exiting from a current UI and displaying only a preview image, and other buttons may be provided to the fourth area AREA4 of the UI.

Figure 3:
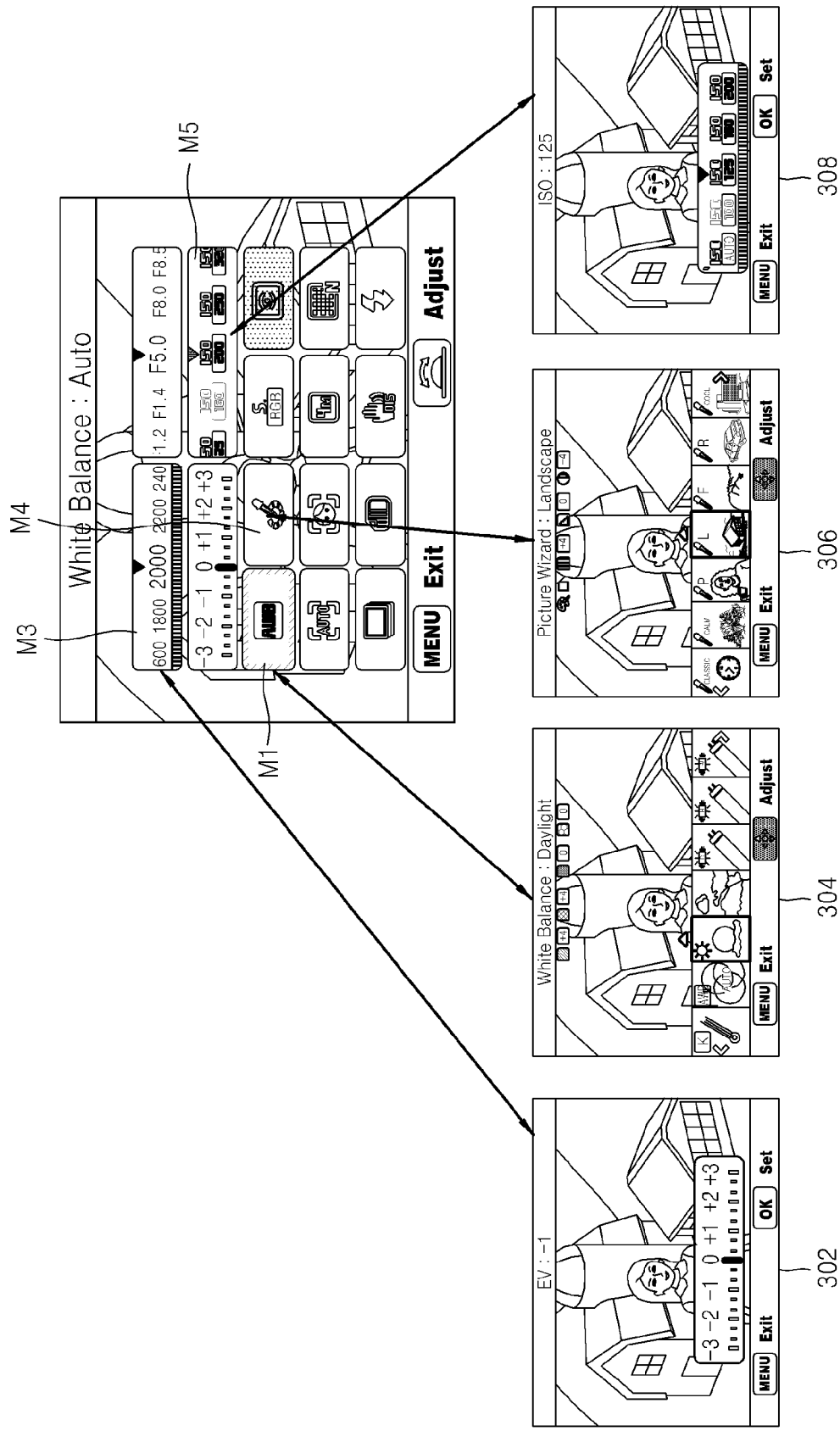
FIG. 3 illustrates a UI manipulating method, according to an embodiment.

FIG. 3 illustrates a UI manipulating method, according to an embodiment.

According to an embodiment, a user may select a method of adjusting a photographing setting value on a lattice-shaped UI or a method of adjusting a photographing setting value on a detailed screen that displays only the photographing setting value which is to be adjusted. For example, when a user selects the auto white balance setting menu M1 and makes an input to enter into a detailed screen, a screen 304 displaying the candidate setting values of an auto white balance is provided. In this case, an image preview showing an image to which an auto white balance currently selected by the user is applied may also be provided. Various detailed screens such as a detailed screen 302 for an exposure value M3, a detailed screen 306 for a tone M4, and a detailed screen 308 for an ISO value M5 may be provided according to a user's input.

Figure 4:
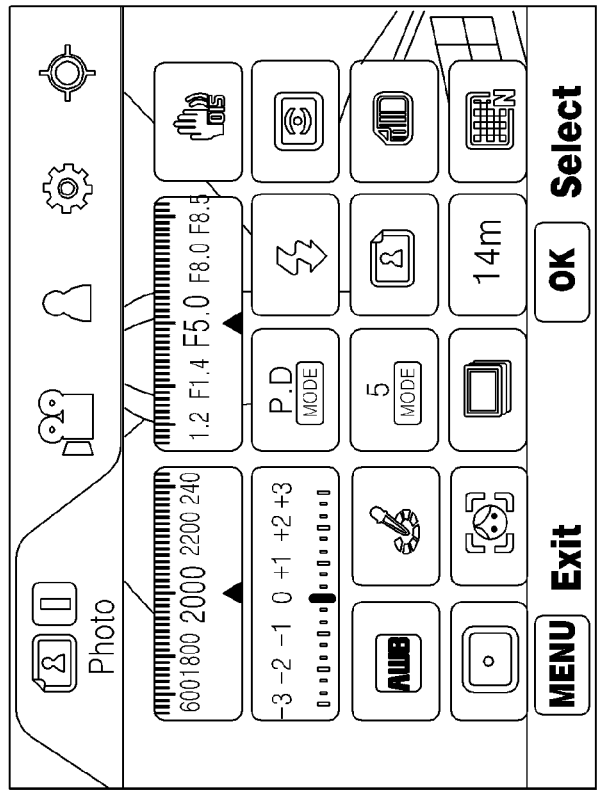
FIG. 4 illustrates a UI providing method, according to an embodiment.
Figure 4:
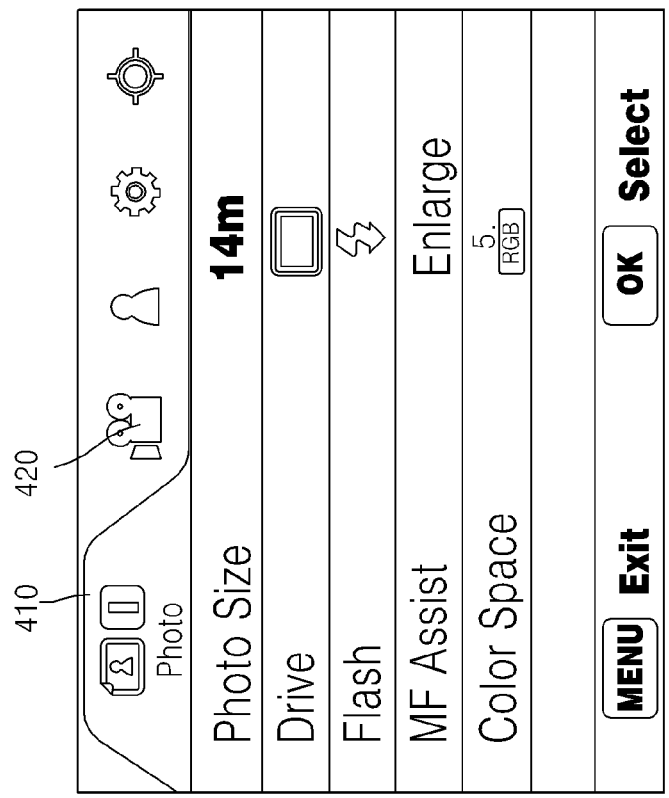

FIG. 4 illustrates a UI providing method, according to an embodiment.

According to the embodiment, a UI that divides setting values that can be set by a user into categories and provides menus arranged in a lattice shape to each category may be provided. In this case, the user may select one from a UI having a list format (A type) and a UI having a lattice format (B type).

Tabs 410 and 420 representing the categories of the setting values may be provided to the UI, and the user may select one of the tabs 410 and 420 to access desired menus.

Figure 5:
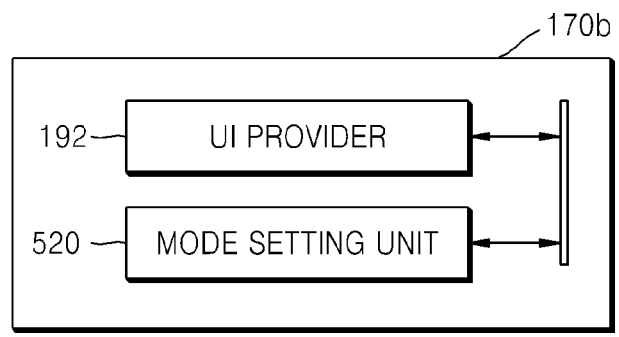
FIG. 5 is a block diagram of a central processing unit (CPU)/digital signal processor (DSP), according to an embodiment.

FIG. 5 is a block diagram of a CPU/DSP 170b, according to an embodiment. Referring to FIG. 5, the CPU/DSP 170b includes the UI provider 192 and a mode setting unit 520.

According to the embodiment, the mode setting unit 520 determines an operation mode according to the type of photographing setting value that a user selects to adjust. According to an embodiment, when the user selects one from among the first group photographing setting values, the mode setting unit 520 may determine an operation mode according to the selection of the user.

According to another embodiment, one of the first group photographing setting values may be set as a reference photographing setting value. For example, the reference photographing setting value may be a brightness correction value.

Figure 6:
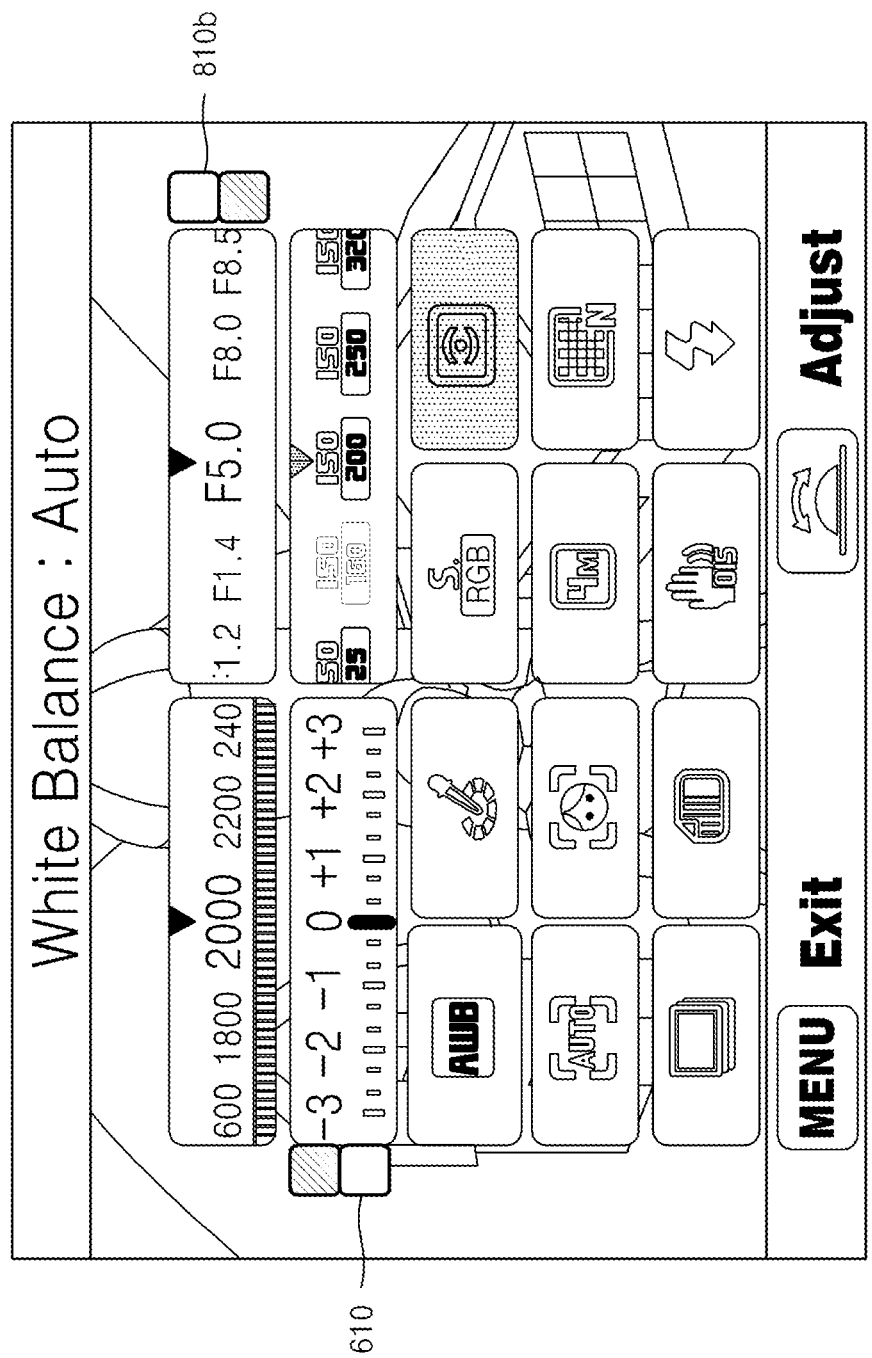
FIG. 6 illustrates a UI screen, according to an embodiment.

FIG. 6 illustrates a UI screen, according to an embodiment. In FIG. 6, a brightness correction value is set as a reference photographing setting value.

According to an embodiment, a user may switch on or off the reference photographing setting value, and the mode setting unit 520 may determine an operation mode according to whether the reference photographing setting value has been switched on or off. The switching on denotes a state where a user is able to adjust the reference photographing setting value, and the switching off denotes a state where a user is not able to adjust the reference photographing setting value.

According to an embodiment, a reference photographing setting value selection button 610 through which a user is able to select switching-on or switching-off of the reference photographing setting value is arranged.

When the reference photographing setting value is switched on, the mode setting unit 520 may set the operation mode to be an operation mode where first group photographing setting values other than the reference photographing setting value are adjusted correspondingly with one another. When the reference photographing setting value is switched off, the mode setting unit 520 may set the operation mode to be a manual mode where the first group photographing setting values other than the reference photographing setting value are adjusted independently from one another.

When the first group photographing setting values change correspondingly with one another and a user adjusts one of the first group photographing setting values, another first group photographing setting value is correspondingly changed. For example, when a user adjusts an aperture value using a first group photographing setting value selection button 810b, a shutter speed is automatically changed, or an image pickup device's sensitivity is automatically changed.

In the manual mode, even when one first group photographing setting value is adjusted, another first group photographing setting value is not changed. For example, in the manual mode, even when a user adjusts an aperture value using the first group photographing setting value selection button 810b, a shutter speed is not changed. According to an embodiment, in the manual mode, when a user adjusts the first group photographing setting values rather than the reference photographing setting value, the reference photographing setting value may be automatically adjusted according to the changes of the first group photographing setting values.

Figure 7:
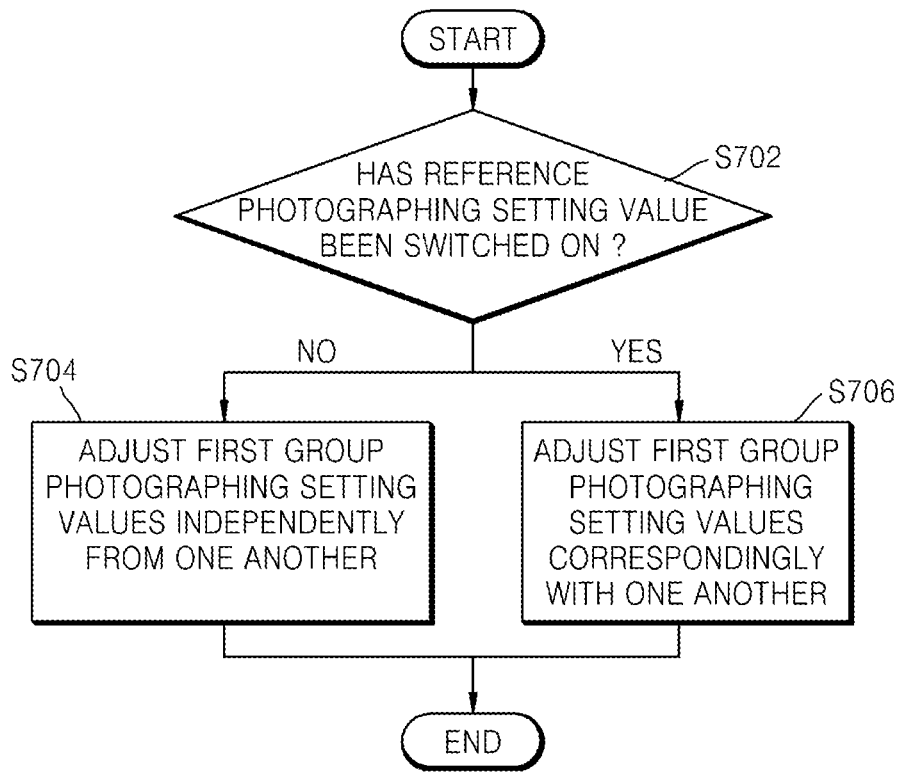
FIG. 7 is a flowchart of a digital photographing apparatus controlling method, according to an embodiment.

FIG. 7 is a flowchart of a digital photographing apparatus controlling method, according to an embodiment.

According to an embodiment, in operation S702, it is determined whether a reference photographing setting value has been switched on or off. When the reference photographing setting value has been switched on, first group photographing setting values are adjusted correspondingly with one another, in operation S706. When the reference photographing setting value has been switched off, first group photographing setting values are adjusted independently from one another, in operation S704.

Figure 8:
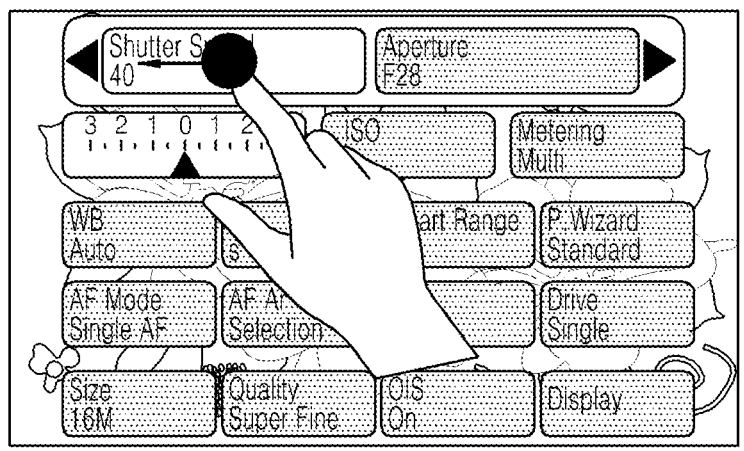
FIG. 8 illustrates a case where a user selects a shutter speed in an embodiment of controlling a UI through a touch screen input.

FIG. 8 illustrates a case where a user selects a shutter speed in an embodiment of controlling a UI through a touch screen input.

The user may select a shutter speed adjustment menu through an action such as tapping, long touching, or dragging of the shutter speed adjustment menu. The user may adjust the shutter speed through an action such as dragging of the shutter speed adjustment menu.

Figure 9:
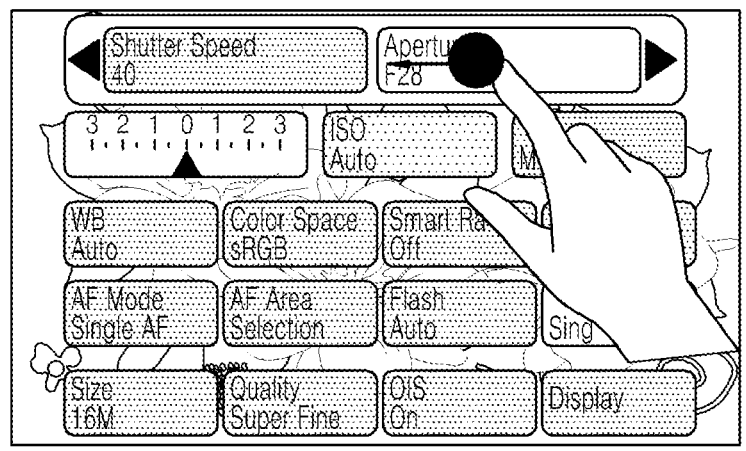
FIG. 9 illustrates a case where a user selects an aperture value in an embodiment of controlling a UI through a touch screen input.

FIG. 9 illustrates a case where a user selects an aperture value in an embodiment of controlling a UI through a touch screen input.

The user may select an aperture value adjustment menu through an action such as tapping, long touching, or dragging of the aperture value adjustment menu. The user may adjust the aperture value through an action such as dragging of the aperture value adjustment menu.

Figure 10:
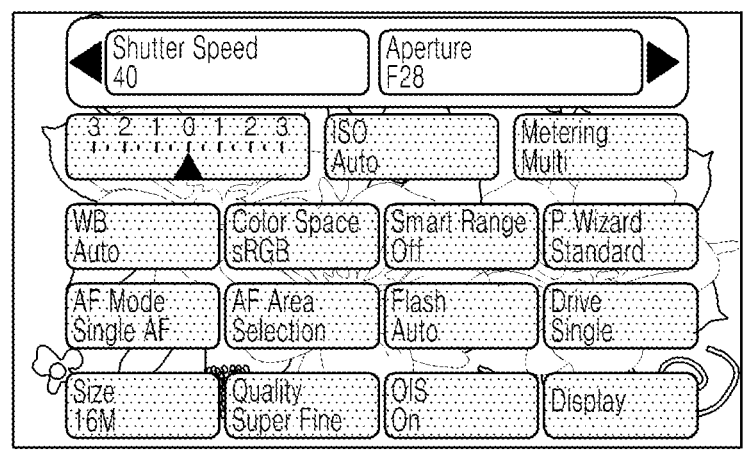
FIG. 10 illustrates a case where a user selects a shutter speed and an aperture value in an embodiment of controlling a UI through a touch screen input.

FIG. 10 illustrates a case where a user selects a shutter speed and an aperture value in an embodiment of controlling a UI through a touch screen input.

According to an embodiment, a user may select a plurality of first group photographing setting value adjust menus. When the user selects a plurality of first group photographing setting value adjustment menus, the mode setting unit 520 provides combinations of the selected first group photographing setting values as candidate setting values and operates in a program mode where the user selects the combinations of the first group photographing setting values. For example, when the user selects a shutter speed and an aperture value as illustrated in FIG. 10, the mode setting unit 520 may provide combinations of the shutter speed and the aperture value as candidate setting values.

According to various embodiments, a user may set a plurality of first group photographing setting values.

According to an embodiment, when one of the first group photographing setting value adjustment menus is selected and a user selects another first group photographing setting value adjustment menu, two first group photographing setting values are selected.

According to another embodiment, a user may select a plurality of first group photographing setting value adjust menus by consecutively dragging the first group photographing setting value adjust menus. For example, the user may select two adjustment menus, for example, an aperture value adjustment menu and a shutter speed adjustment menu, by consecutively dragging the aperture value adjustment menu and the shutter speed adjustment menu as in the embodiment of FIG. 10.

According to another embodiment, a user may select a plurality of desired first group photographing setting values through a gesture of drawing a loop around the desired first group photographing setting values. For example, as in the embodiment of FIG. 10, the user may select both the aperture value adjustment menu and the shutter speed adjustment menu by taking a gesture of drawing a loop around the aperture value adjustment menu and the shutter speed adjustment menu through a touch screen input.

According to another embodiment, when the mode setting unit 520 determines a current operation mode according to the type of first group photographing setting value selected by a user, the UI provider 192 may provide a mark representing the current operation mode to a predetermined region on a UI screen. The mode setting unit 520 may determine the current operation mode as follows.

Figure 11:
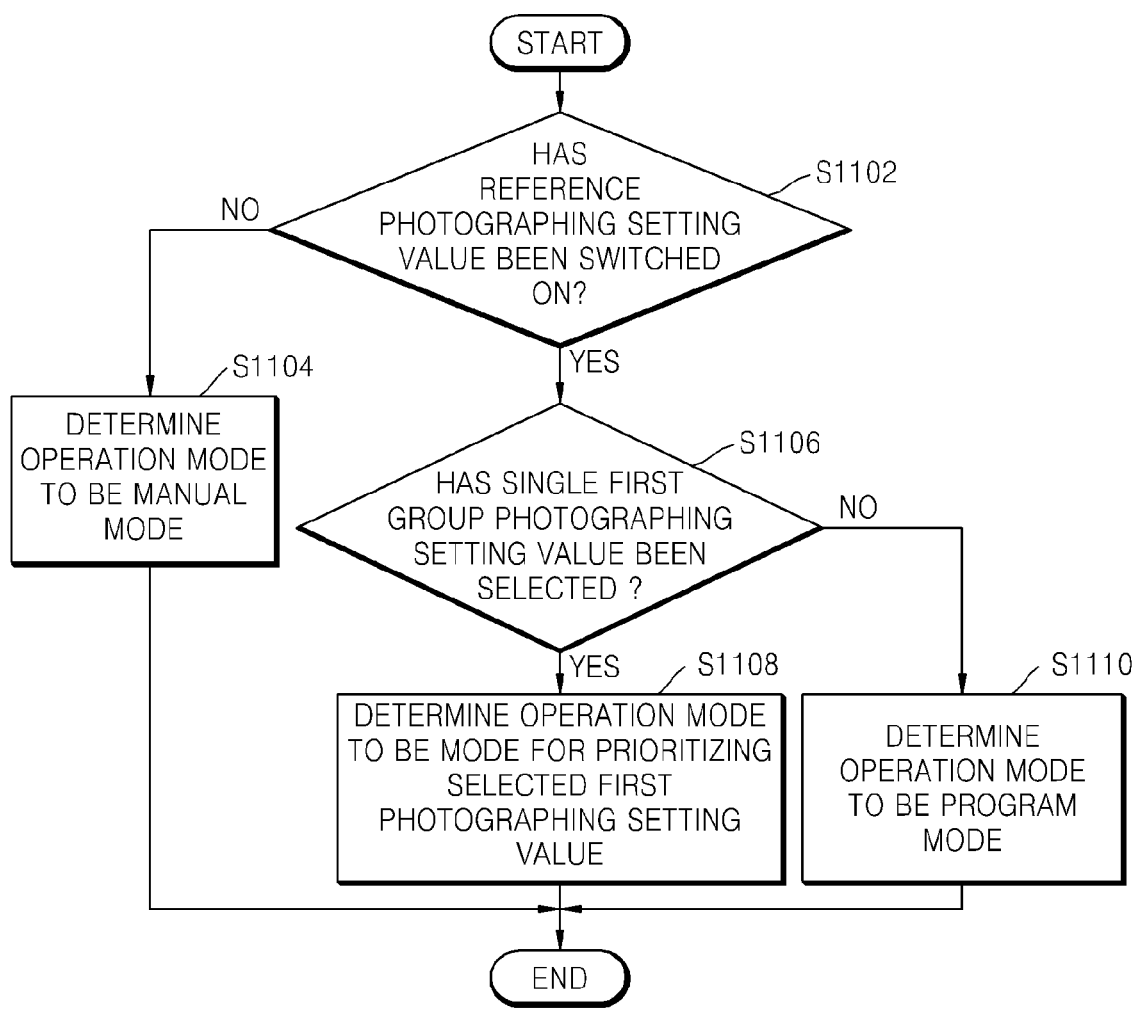
FIG. 11 is a flowchart of a mode determining operation in a digital photographing apparatus controlling method, according to an embodiment.

FIG. 11 is a flowchart of a mode determining operation in a digital photographing apparatus controlling method, according to an embodiment.

Referring to FIG. 11, in operation S1102, it is determined whether a reference photographing setting value has been switched on or off. When the reference photographing setting value has been switched off, an operation mode is determined to be a manual mode, in operation S1104. When the reference photographing setting value has been switched on, it is determined whether a single first group photographing setting value has been selected or a plurality of first group photographing setting values have been selected, in operation S1106. When a single first group photographing setting value has been selected, the operation mode is determined to be a mode for prioritizing the selected first group photographing setting value, in operation S1108. For example, when an aperture value has been selected, the operation mode is determined to be an aperture priority mode, and when a shutter speed has been selected, the operation mode is determined to be a shutter speed priority mode. When a plurality of first group photographing setting values have been selected, the operation mode is determined to be a program mode, in operation S1110.

Figure 12:
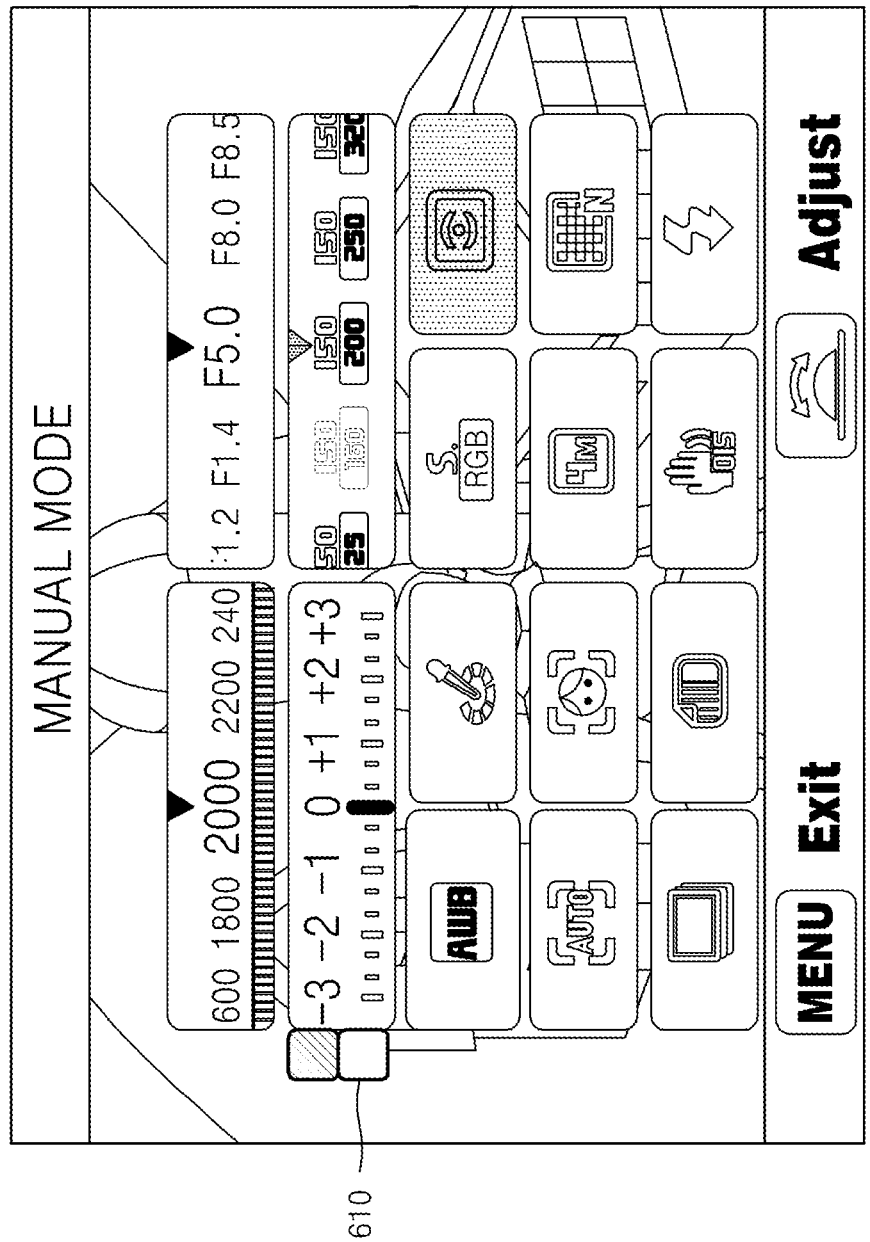
FIG. 12 illustrates a UI screen, according to an embodiment.

FIG. 12 illustrates a UI screen, according to an embodiment.

As described above, when an operation mode is determined according to the type of menu selected by a user, a mark representing the operation mode is displayed on a predetermined region on the UI screen. For example, as shown in FIG. 12, when a current mode is determined to be a manual mode, the manual mode is marked on an upper portion of the UI screen.

According to various embodiments, since an operation mode is automatically set according to which first group photographing setting value is adjusted by a user, the operation mode is fluid and various operation modes may be set as compared with existing digital photographing apparatuses. However, a current operation mode may be defined so that the user can easily recognize the current operation mode, as described above, and the current operation mode may be informed to the user.

According to various embodiments, a user may set an operation mode easily and intuitively.

According to various embodiments, a user may also easily set photographing setting values.

According to various embodiments, a UI through which a user can recognize and adjust all photographing setting values is provided. The invention can be embodied as computer readable codes on a computer-readable recording medium. The computer-readable recording medium is any data storage device that can store data which can be thereafter read by a computer system.

The computer-readable codes are used to perform operations of implementing a digital photographing apparatus controlling method according to various embodiments when the computer-readable codes are read from the computer-readable storage medium and executed by a processor (for example, the CPU/DSP 170*a*). The computer-readable codes can be implemented with various programming languages. Functional programs, codes, and code segments for accomplishing the embodiments can be easily programmed by one of ordinary skill in the art to which the invention pertains.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer readable codes are stored and executed in a distributed fashion.

All references, including publications, patent applications, and patents, cited herein are hereby incorporated by reference to the same extent as if each reference were individually and specifically indicated to be incorporated by reference and were set forth in its entirety herein.

The invention has been described by referring to exemplary embodiments. While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the invention.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A digital photographing apparatus controlling method comprising:

providing graphical menus on a display screen of the digital photographing apparatus for respectively adjusting first group photographing setting values;

selecting the graphical menu for one of the first group photographing setting values as a graphical menu for adjusting a reference photographing setting value;

setting the graphical menu for adjusting the reference photographing setting value to one of an on state or an off state, the on state being a state in which a user is able to adjust the reference photographing setting value and the off state being a state in which the user is not able to adjust the reference photographing value;

setting an operation mode according to which one of the first group photographing setting values a user has selected as the reference photographing setting value and whether the graphical menu for adjusting the reference photographing setting value is in the on state or the off state;

adjusting the first group photographing setting values, other than the first group photographing setting value selected as the reference photographing setting value, correspondingly with one another when the graphical menu for adjusting the reference photographing setting value is in the on state; and adjusting the first group photographing setting values, other than the first group photographing setting value selected as the reference photographing setting value, independently from one another when the graphical menu for adjusting the reference photographing setting value is in the off state, wherein:

the first group photographing setting values comprise at least one of a brightness correction value, a shutter speed, an aperture value, and an image pickup device's sensitivity, and the operation mode comprises at least one of a manual mode, a priority mode, and a program mode.

2. The digital photographing apparatus controlling method of claim 1, wherein, in the adjusting of the first group photographing setting values correspondingly with one another, when a user input of adjusting one of the first group photographing setting values is made, the other first group photographing setting values are adjusted.

3. The digital photographing apparatus controlling method of claim 1, wherein, when the graphical menu for adjusting the reference photographing setting value has been switched on and at least two of the first group photographing setting values are selected for adjustment, providing a menu through which a combination of the at least two first group photographing setting values is selected.

4. The digital photographing apparatus controlling method of claim 1, further comprising providing a mark representing a current mode according to at least one of whether the graphical menu for adjusting the reference photographing setting value is in the on state or the off state and which one of the first group photographing setting values the user has selected for adjustment.

5. The digital photographing apparatus controlling method of claim 1, wherein the first group photographing setting value selected as the reference photographing setting value is a brightness correction value, and the other first group photographing setting values are at least two values selected from the group consisting of a shutter speed, an aperture value, and an image pickup device's sensitivity.

6. The digital photographing apparatus controlling method of claim 1, wherein the graphical menus for the first group photographing setting values are provided to display a plurality of selectable numerically-represented candidate setting values.

7. The digital photographing apparatus controlling method of claim 1, wherein the graphical menu for adjusting the reference photographing setting value is switched to the on state via a reference photographing setting value selection button.

8. A digital photographing apparatus comprising:

a user interface (UI) provider which provides graphical menus on a display screen of the digital photographing apparatus for respectively adjusting first group photographing setting values, enables a user to select the graphical menu for one of the first group photographing setting values as a graphical menu for adjusting a reference photographing setting value, and enables the user to set the graphical menu for adjusting the reference photographing setting value to one of an on state or an off state, the on state being a state in which the user is able to adjust the reference photographing setting value and the off state being a state in which the user is not able to adjust the reference photographing setting value; and a mode setting unit which sets an operation mode according to which one of the first group photographing setting values a user has selected as the reference photographing setting value and whether the graphical menu for adjusting the reference photographing setting value is in the on state or the off state, wherein the mode setting unit adjusts the first group photographing setting values, other than the first group photographing setting value selected as the reference photographing setting value, correspondingly with one another when the graphical menu for adjusting the reference photographing setting value is in the on state, and adjusts the first group photographing setting values, other than the first group photographing setting value selected as the reference photographing setting value, independently from one another when the graphical menu for adjusting the reference photographing setting value is in the off state, wherein:

the first group photographing setting values comprise at least one of a brightness correction value, a shutter speed, an aperture value, and an image pickup device's sensitivity, and the operation mode comprises at least one of a manual mode, a priority mode, and a program mode.

9. The digital photographing apparatus of claim 8, wherein, when the first group photographing setting values are adjusted correspondingly with one another and a user input of adjusting one of the first group photographing setting values is made, the mode setting unit adjusts the other first group photographing setting values.

10. The digital photographing apparatus of claim 8, wherein, when the graphical menu for adjusting the reference photographing setting value is in the on state and at least two of the first group photographing setting values are selected for adjustment, the UI provider provides a menu through which a combination of the at least two first group photographing setting values is selected.

11. The digital photographing apparatus of claim 8, wherein the UI provider provides a mark representing a current mode according to at least one of whether the graphical menu for adjusting the reference photographing setting value is in the on state or the off state and which one of the first group photographing setting values the user has selected for adjustment.

12. The digital photographing apparatus of claim 8, wherein the first group photographing setting value selected as the reference photographing setting value is a brightness correction value, and the other first group photographing setting values are at least two values selected from the group consisting of a shutter speed, an aperture value, and an image pickup device's sensitivity.

13. The digital photographing apparatus of claim 8, wherein the graphical menus for the first group photographing setting values are provided to display a plurality of selectable numerically-represented candidate setting values.

14. A non-transitory computer-readable storage medium for storing computer program codes for executing a digital photographing apparatus controlling method, the digital photographing apparatus controlling method comprising:

providing graphical menus on a display screen of the digital photographing apparatus for respectively adjusting first group photographing setting values;

selecting the graphical menu for one of the first group photographing setting values as a graphical menu for adjusting a reference photographing setting value;

setting the graphical menu for adjusting the reference photographing setting value to one of an on state and an off state, the on state being a state in which a user is able to adjust the reference photographing setting value and the off state being a state in which the user is not able to adjust the reference photographing setting value;

setting an operation mode according to which one of the first group photographing setting values a user has selected as the reference photographing setting value and whether the graphical menu for adjusting the reference photographing setting value is in the on state or the off state;

adjusting the first group photographing setting values, other than the first group photographing setting value selected as the reference photographing setting value, correspondingly with one another when the graphical menu for adjusting the reference photographing setting value is in the on state; and adjusting the first group photographing setting values, other than the first group photographing setting value selected as the reference photographing setting value, independently from one another when the graphical menu for adjusting the reference photographing setting value is in the off state, wherein:

the first group photographing setting values comprise at least one of a brightness correction value, a shutter speed, an aperture value, and an image pickup device's sensitivity, and the operation mode comprises at least one of a manual mode, a priority mode, and a program mode.

15. The non-transitory computer-readable storage medium of claim 14, wherein, in the adjusting of the first group photographing setting values correspondingly with one another, when a user input of adjusting one of the first group photographing setting values is made, the other first group photographing setting values are adjusted.

16. The non-transitory computer-readable storage medium of claim 14, wherein the digital photographing apparatus controlling method further comprises, when the graphical menu for adjusting the reference photographing setting value is in the on state and at least two of the first group photographing setting values are selected for adjustment, providing a menu through which a combination of the at least two first group photographing setting values is selected.

17. The non-transitory computer-readable storage medium of claim 14, wherein the digital photographing apparatus controlling method further comprises providing a mark representing a current mode according to at least one of whether the graphical menu for adjusting the reference photographing setting value is in the on state or the off state and which one of the first group photographing setting values the user has selected for adjustment.

18. The non-transitory computer-readable storage medium of claim 14, wherein the first group photographing setting value selected as the reference photographing setting value is a brightness correction value, and the other first group photographing setting values are at least two values selected from the group consisting of a shutter speed, an aperture value, and an image pickup device's sensitivity.

19. The non-transitory computer-readable storage medium of claim 14, wherein the graphical menus for the first group photographing setting values are provided to display a plurality of selectable numerically-represented candidate setting values.

\* \* \* \* \*